United States Patent
Toyota (10) Patent No.: US 6,450,692 B2
(45) Date of Patent: Sep. 17, 2002

(54) ROLLING DEVICE

(75) Inventor: Hiroshi Toyota, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 27 days.

(21) Appl. No.: 09/737,041

(22) Filed: Dec. 14, 2000

(30) Foreign Application Priority Data

Dec. 20, 1999 (JP) ............................................. 11-361058

(51) Int. Cl.$^7$ ................................................ F16C 33/66
(52) U.S. Cl. ...................................... 384/491; 384/516
(58) Field of Search ................................ 384/462, 491, 384/516, 565, 569

(56) References Cited

U.S. PATENT DOCUMENTS 5,782,135 A 7/1998 Kondo et al.
5,904,426 A 5/1999 Tsuru et al.

FOREIGN PATENT DOCUMENTS

| EP | 0794343 | 9/1997 |
|---|---|---|
| EP | 0794345 | 9/1997 |
| EP | 0930445 | 7/1999 |
| EP | 0997906 A1 | 5/2000 |
| JP | 07042746 | 2/1995 |
| JP | 07118683 A | 5/1995 |
| JP | 08283767 A | 10/1996 |
| JP | 09229074 | 9/1997 |
| JP | 2000-205267 | 7/2000 |
| JP | 2000205284 | 7/2000 |
| WO | WO9802880 | 1/1998 |

*Primary Examiner*—Lenard A. Footland
(74) *Attorney, Agent, or Firm*—Jordan and Hamburg LLP (57) ABSTRACT

An arrangement in which respective roughnesses are defined for orbital grooves of inner and outer rings and a surface of rolling members which are constituents of a rolling bearing and in which their conditions of contact are controlled whereupon a minimum amount lubricating oil is adhered at a strong bonding force to thereby obtain a condition in which lubricating oil is continuously interposed at mutual contacting portions of the inner and outer rings, the rolling members and a cage to thereby enable favorable sliding properties and remarkable restrictions in generation of dust.

9 Claims, 6 Drawing Sheets

ROLLING DEVICE

BACKGROUND OF THE INVENTION

1. Field of the Invention

The present invention relates to a rolling device in which two, inner and outer members that are disposed in a concentric manner are provided to be relatively displaceable through a plurality of rolling elements. The rolling device may be comprised by, for instance, a rolling bearing, a direct-acting type bearing or a ball screw device.

2. Description of the Related Art

Out of such rolling devices, those employed in a high vacuum environment such as in a delivery system disposed within a device for manufacturing semiconductors are required to exhibit especially strict specifications such as low dust-generating characteristics, smoothness of operation or high durability.

It is the case with conventional rolling devices that grease utilizing fluorine oil as base oil is sealed or fluorine oil is applied to portions at which rolling members perform rolling contact. Such fluorine oil does not include any functional groups in its molecular structure.

When utilizing such grease, external dispersion is coped with by decreasing the amount of sealed grease while such a measure may lead to lack in lubricating actions or degradations in durability.

When utilizing fluorine oil, it may similarly happen that lubricating actions fall short or the durability is degraded in case conditions in view of load or revolution speed become harder.

While it has already been devised to perform coating of fluorine high-molecular solid lubricants, such a measure is considered to provide insufficient durability causing peeling, dropout or increased generation of dust owing to wear in conditions in which relatively large axial load is applied.

SUMMARY OF THE INVENTION

It is a main purpose of the present invention to provide a rolling device that is capable of satisfying demands for achieving low dust-generating characteristics, smoothness of operation and improvements in durability.

Other objects, features and advantages of the present invention will become apparent from the following descriptions.

In summary, the two, inner and outer members that are disposed in a concentric manner are provided to be relatively displaceable through a plurality of rolling members.

A surface roughness of each rolling member is set to be smaller than a surface roughness of orbital planes the rolling members contact with each of the members.

Fluorine lubricating oil including a functional group in its molecular structure is adhered at least on the orbital planes in a manner as to fill each roughness of the orbital plane to extend from crest portions to trough portions.

In the present invention, a minimum amount of required lubricating oil exhibiting fluidity, which does not cause peeling, dropout or wear as it was the case with conventional solid lubricating oil, is adhered to the orbital planes that are defined to be of a specified roughness whereupon strong adsorption is achieved through bonding of the functional group within the lubricating oil with atomic chains on the surfaces of the orbital planes.

With this arrangement, metals are prevented from directly contacting each other during rolling operations of the rolling members and a condition is continuously maintained in which the lubricating oil does not fall short to thereby maintain stable lubricating actions.

The present invention is arranged in that the surface roughness of the orbital planes of the two members and the surface roughness of the rolling members are defined and their contacting conditions are controlled whereupon a minimum amount of required lubricating oil exhibiting fluidity, which does not cause peeling, dropout or wear as it was the case with coating films made of conventional solid lubricates, is adhered to the orbital planes through strong bonding force.

With this arrangement, contacting members will not come in contact with each other as metals without lubrication but will continuously contact each other with the lubricating oil being interposed between. Thus, it is possible to remarkably reduce the amount of generated dust and to remarkably improve lubricating properties and to therefore contribute to smoothness of operation and improvements in durability.

BRIEF DESCRIPTION OF THE DRAWINGS

These and other objects as well as advantages of the present invention will become clear by the following description of preferred embodiments of the present invention with reference to the accompanying drawings, wherein.

In all of these figures, like components are indicated by the same numerals.

DETAILED DESCRIPTION OF THE INVENTION

Preferred embodiments of the present invention will now be explained hereinafter with reference to the drawings.

Figure 1:
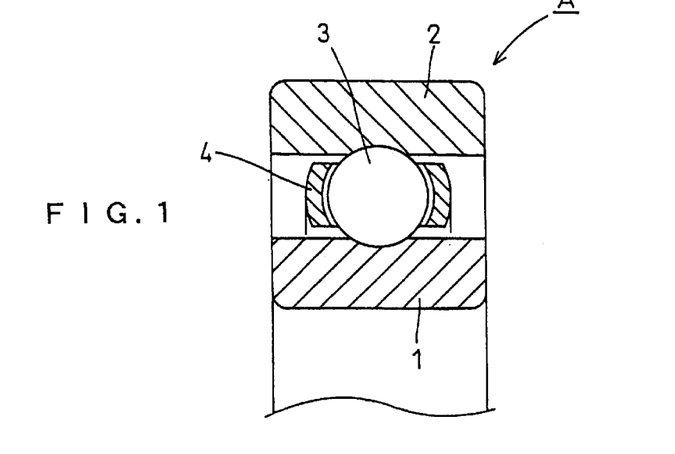
FIG. 1 is a longitudinal sectional view of an upper half of a rolling bearing according to one embodiment of the present invention.
Figure 2A:
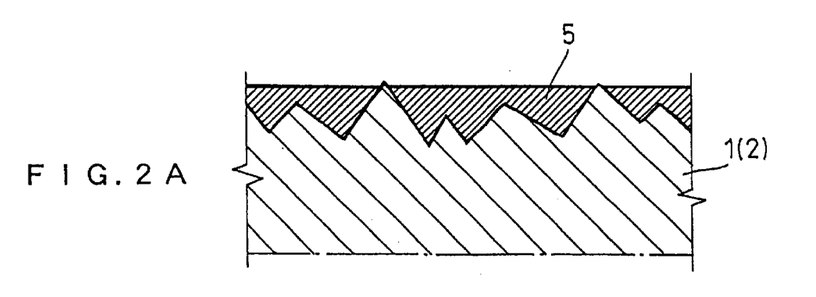
FIG. 2 is an enlarged sectional view illustrating an adhering condition of lubricating oil to orbital planes of inner and outer rings of the above bearing and to surfaces of rolling members.
Figure 2B:
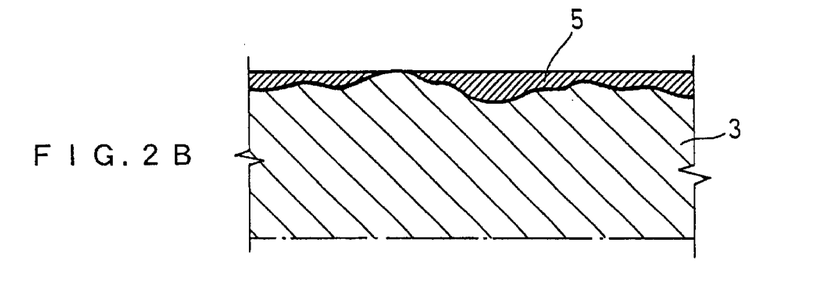

In referring to FIGS. 1 and 2, A illustrates an overall view of the rolling bearing such as a roll bearing of deep-groove type, wherein 1 denotes an inner ring, 2 an outer ring, 3 a spherical rolling member, 4 a press-molded cage having a waveform, and 5 lubricating oil.

More particularly, the inner ring 1, the outer ring 2, the rolling member 3 and the cage 4 may be either made of a metallic material that is generally employed for use as bearings or of a metallic material exhibiting, for instance, corrosion-resistant properties.

The metallic material with corrosion-resistant properties may, for instance, be a metallic material in which martensitic stainless steel such as SUS440C, JIS standard, or precipitation hardening type stainless steel such as SUS630, JIS standard, underwent suitable thermosetting treatments. When employed for purposes in which the amount of applied load is small, it is also possible to employ austenitic stainless steel such as SUS304, JIS standard.

The material for the cage 4 is suitably selected from among the above metallic materials, brass and titanic materials.

The cage 4 may also be made of synthetic resin.

Examples of such synthetic resin may, for instance, be fluorine resin such as polytetrafluoroethylene (hereinafter abbreviated as PTFE) or ethylenetetra fluoroethylene (ETFE) or engineering plastics such as polyether etherketone (PEEK), polyphenylene sulfide (PPS), polyether sulfone (PES) or nylon 46.

The resin may be added with reinforcing fiber such as glass fiber.

The shape of the cage 4 may, besides the waveform, be of a crown-like form or of a machined form.

The lubricating oil 5 is adhered to orbital grooves of the inner ring 1 and the outer ring 2 as well as to the surface of the rolling member 3.

The form for adhering the lubricating oil 5 being characteristic, detailed explanations thereof will follow hereinafter.

The surface roughness of both orbital grooves of the inner ring 1 and the outer ring 2 is set to be 0.1 to 0.2 μm in units of ten-score average roughness [Rz] and the surface roughness of the rolling member 3 is set to be 0.01 to 0.02 μm in units of ten-score average roughness [Rz].

As illustrated in FIG. 2, lubricating oil 5 is adhered in a manner as to fill the roughness of both orbital grooves of the inner ring 1 and the outer ring 2 as well as the surface of the rolling member 3 to extend from crest portions to trough portions.

The lubricating oil 5 is comprised of fluorine oil including a functional group within its molecular structure and takes the forms of a so-called gel.

More particularly, fluoropolyether polymer or polyfluoroalkyl polymer intermixed with a suitable binder is used as a base oil of the lubricating oil 5 to which a functional group is mixed to the molecular structure thereof. The fluoropolyether polymer that is intermixed to the base oil may be a polymer having a main structural unit that is given by a general formula of $-C_xF_{2x}-O-$ (wherein x is an integer of 1 to 4) with an average molecular weight amount of 1,000 to 50,000.

Examples of the polyfluoroalkyl polymer are listed in the chemical formula 1. A favorably used functional group may be one exhibiting high affinity with metal such as of epoxy group, amino group, carboxyl group, hydroxide group, mercapto group, sulfone group or ester group, and examples thereof are listed in the chemical formulas 2 and 3 below.

[Chemical Formula 1]

[Chemical Formula 2]

[Chemical Formula 3]

In more details, favorably used lubricating oil 5 may be selected from perfluoropolyether (PFPE) or a mixture with a derivative thereof; more particularly, commercially available products manufactured by the firm of Montecatini under the product names of FONBLIN Y Standard, FONBLIN Emulsion (FE20, EM04, and the like) or FONBLIN Z Derivatives (FONBLIN Z DEAL, FONBLIN Z DIAC, FONBLIN Z DISOC, FONBLIN Z DOL, FONBLIN Z DOLTX2000, FONBLIN Z TETRAOL, and the like) may be suitably used. Since all of the above listed products are of high density, it is preferable to use them upon dilution by using a suitable dilution solvent in a manner to be described later. It should be noted that since the above-listed FONBLIN Z Derivatives are apt to harm vacuum ventilating systems when used in vacuum conditions, it is desirable to consider environments of usage thereof.

One example for adhering the lubricating oil 5 will now be explained.

The inner ring 1, the outer ring 2, the rolling member 3 and the cage 4 are respectively assembled to complete the rolling bearing A. In the completed condition, a required amount of the prepared lubricating oil 5 is inserted to spaces between the inner and outer rings 1 and 2 where the rolling member 3 resides by using a pipette or the like, and upon rotating the rolling member several times, the lubricating member 5 is applied to the inner and outer rings 1, 2, the rolling member 3 as well as rolling and sliding members of the cage 4.

Supply of the lubricating oil 5 may alternatively be performed through spraying or through immersion into a reservoir tank for the lubricating oil 5. The prepared lubricating oil 5 may, for instance, be obtained by diluting FONBLIN Emulsion FE20 (FONBLIN density 20 mass %) with a suitable dilution solvent up to a FONBLIN density of 0.25 mass %. It should be noted that the dilution solvent might be of volatile type such as a methanol solvent, an alcohol solvent or water.

Thereafter, the entire rolling bearing A applied with the lubricating oil 5 is heated for approximately 3 minutes at a temperature of 40 to 50° C. to remove the dilution solvent included in the lubricating oil 5.

As explained so far, upon defining the surface roughness of the orbital planes of the inner and outer rings 1, 2 and the surface roughness of the rolling member 3 and controlling their contacting conditions, a minimum amount of required lubricating oil is made to adhere thereto. Since only a minimum amount of required lubricating oil contributes to the lubrication at mutual portions of contact between the inner and outer rings 1, 2, the rolling member 3 and the cage 4, generation of dust owing to dispersion of excess lubricating oil or other factors and occurrence of outgas will be remarkably reduced. Moreover, since a rotational resistance will be remarkably smaller than compared to cases in which grease is employed for providing lubrication, it is possible to achieve rotating performances of high accuracy.

While a minimum amount of lubricating oil shall be applied to fill from crest portions to trough portions of the surface roughness when applying the lubricating oil, in case the lubricating oil is adhered by an amount exceeding the above-described minimum amount, it may result in dispersion, in an increased amount of outgas and also in an increase in rotational torque; on the other hand, in case the lubricating oil is adhered by an amount that is less than the above-described minimum amount, the crest portions of the surface roughness will be completely exposed to scrape off oil layers of opposing sides to thereby cause boundary lubricating conditions and may lead to partial baking.

Tests in view of dust-generating characteristics, torque and durability have been performed for the above-described forms of adhering the lubricating oil, and explanations thereof will follow.

A comparative example used for the dust-generating characteristics test was prepared by coating fluorine solid lubricating oil, and a comparative example used for the torque test was prepared by applying fluorine grease with its base oil being fluorine oil. It should be noted that the above-described fluorine solid lubricating film was particularly obtained by adding a fluorine-including polymer without any functional group (FONBLIN Z-60) to a fluorine-including polymer including a functional group of isocyanate at an end thereof (FONBLIN Z DISOC).

A bearing used for the tests had a bearing number of 608, and conditions for testing were set to be a revolution speed of 200 rpm and a load of 50N or 100N. In the example of the illustrated embodiment, it is assumed that the surface roughness of the orbital planes of the inner and outer rings 1, 2 was set to 0.2 μm each in units of ten-score average roughness [Rz] and the surface roughness of the rolling member 3 was set to 0.02 μm in units of ten-score average roughness [Rz], respectively, and the lubricating oil 5 was applied in the peculiar manner as described above.

Figure 3:
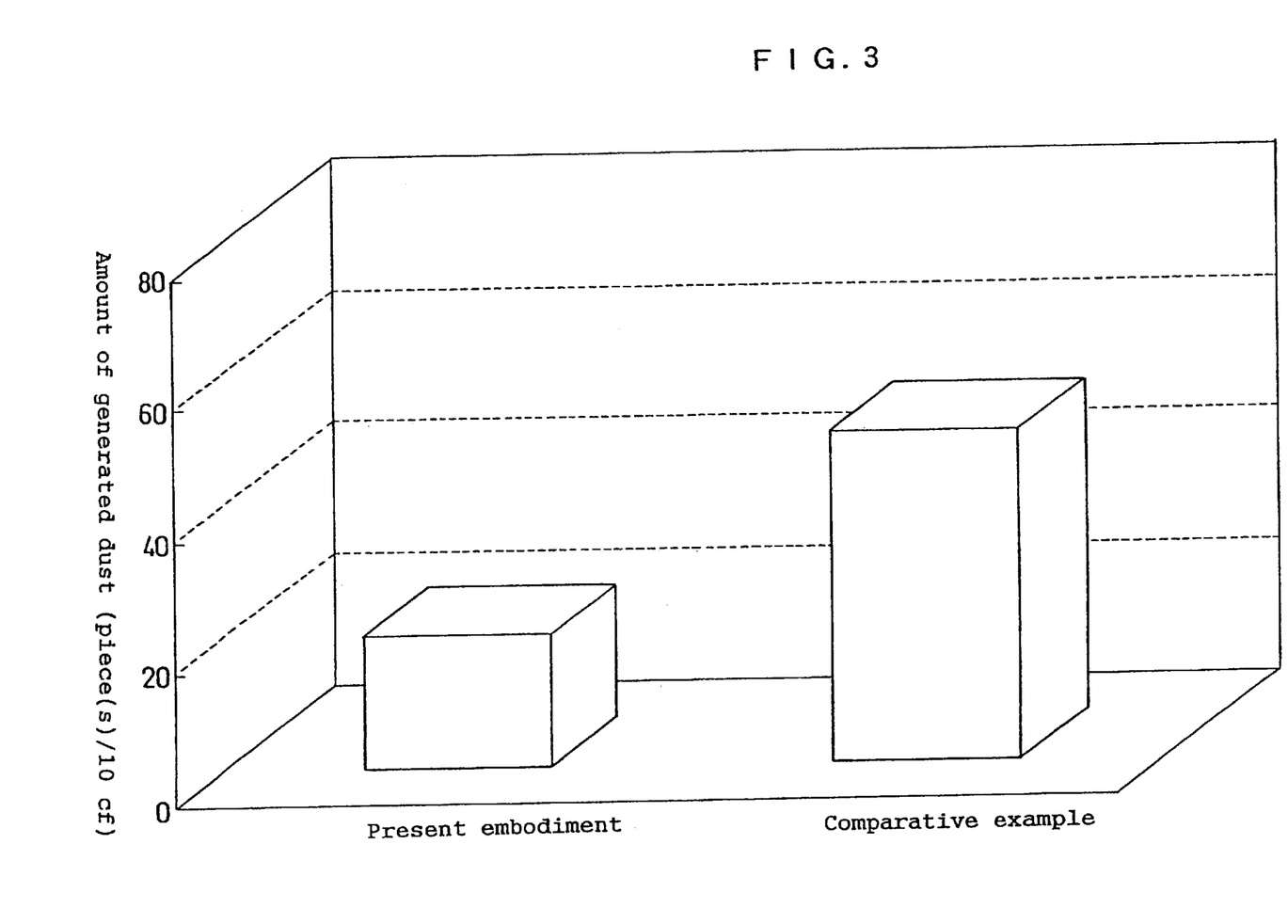
FIG. 3 is a chart indicating results of a dust-generating test.

As illustrated in FIG. 3, results of the dust-generating characteristics test indicated that the amount of generated dust according to the present invention was not more than ½ of that of the comparative example and was thus of a remarkably low level.

Figure 4:
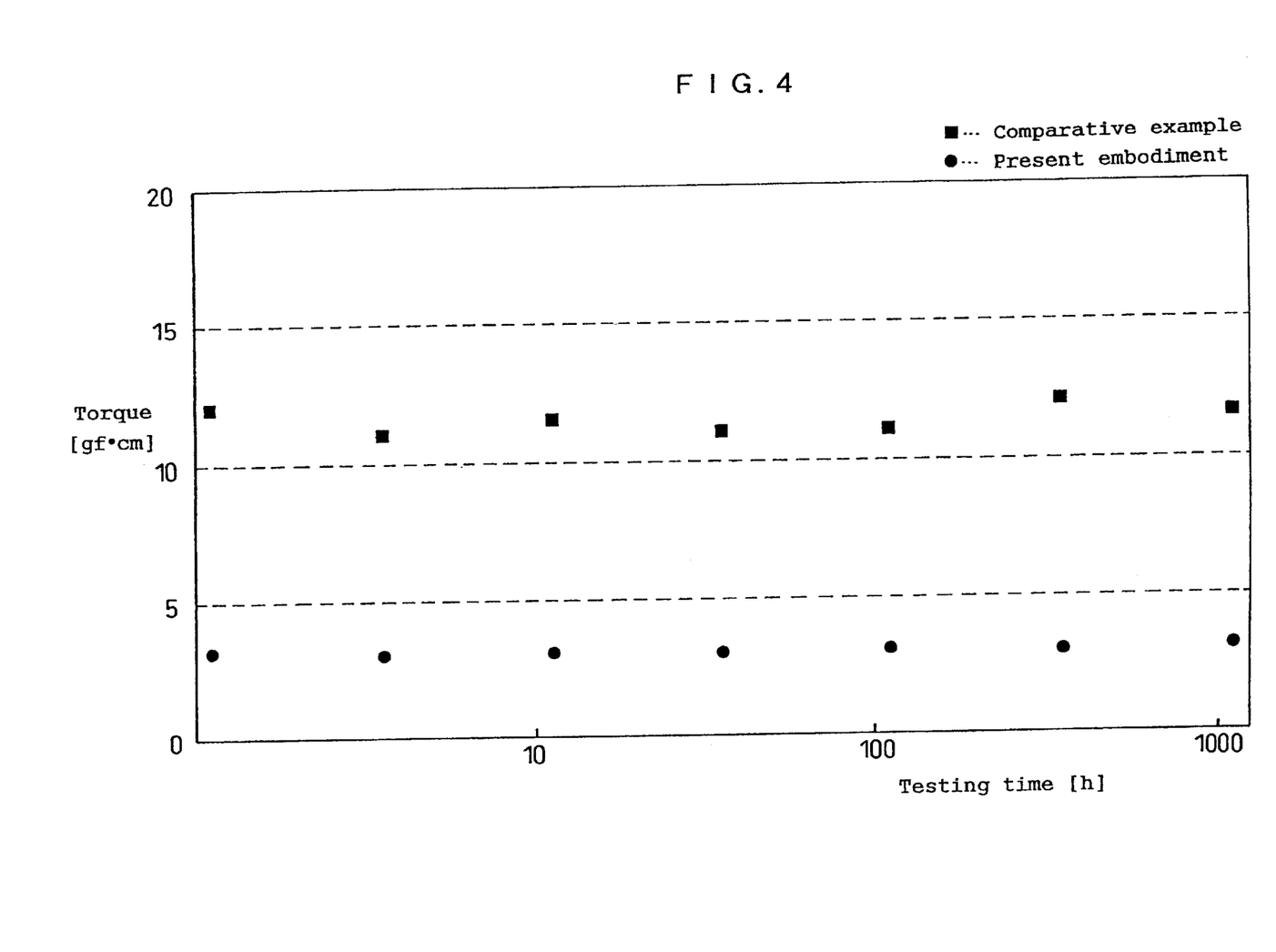
FIG. 4 is a chart indicating results of a torque test.

As illustrated in FIG. 4, results of the torque test indicated that the torque value of the present invention was approximately ⅓ of that of the comparative example and was thus a remarkably lower torque value that could be maintained over a long period.

Figure 5:
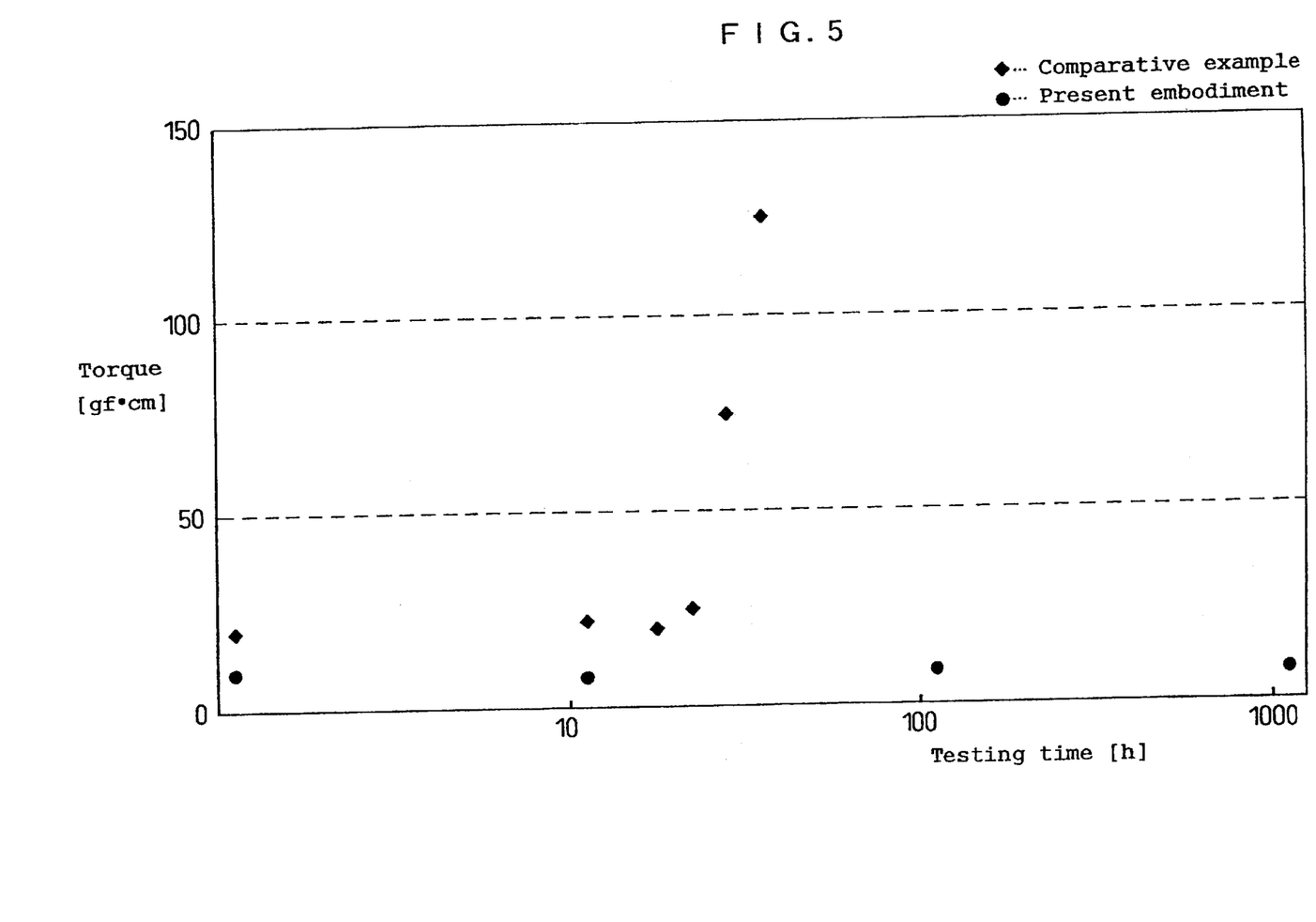
FIG. 5 is a chart indicating results of a torque life test.

As illustrated in FIG. 5, results of the torque life test indicated that the torque value of the comparative example remarkably increased upon elapse of several tens of hours from the start of testing while the torque value of the present invention remained low even after elapse of 1,000 hours and could be continued with hardly any changes.

It should be noted that the present invention is not limited to the above-described embodiment but various applications or modifications thereof are imaginable.

For instance, while the bearing used in the above embodiment is a roller bearing of deep-groove type, the present invention is also applicable to rolling bearings of different types.

Figure 6:
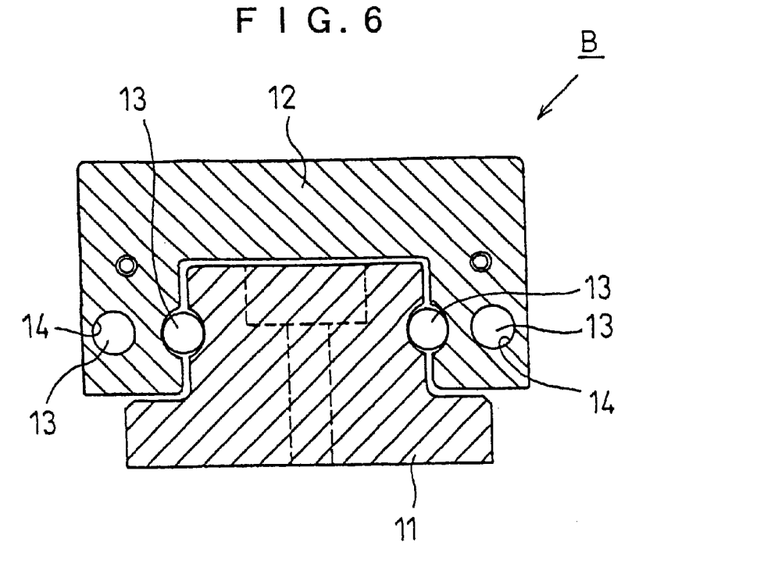
FIG. 6 is a longitudinal sectional view of an upper half of a direct-acting type bearing according to another embodiment of the present invention.
Figure 7:
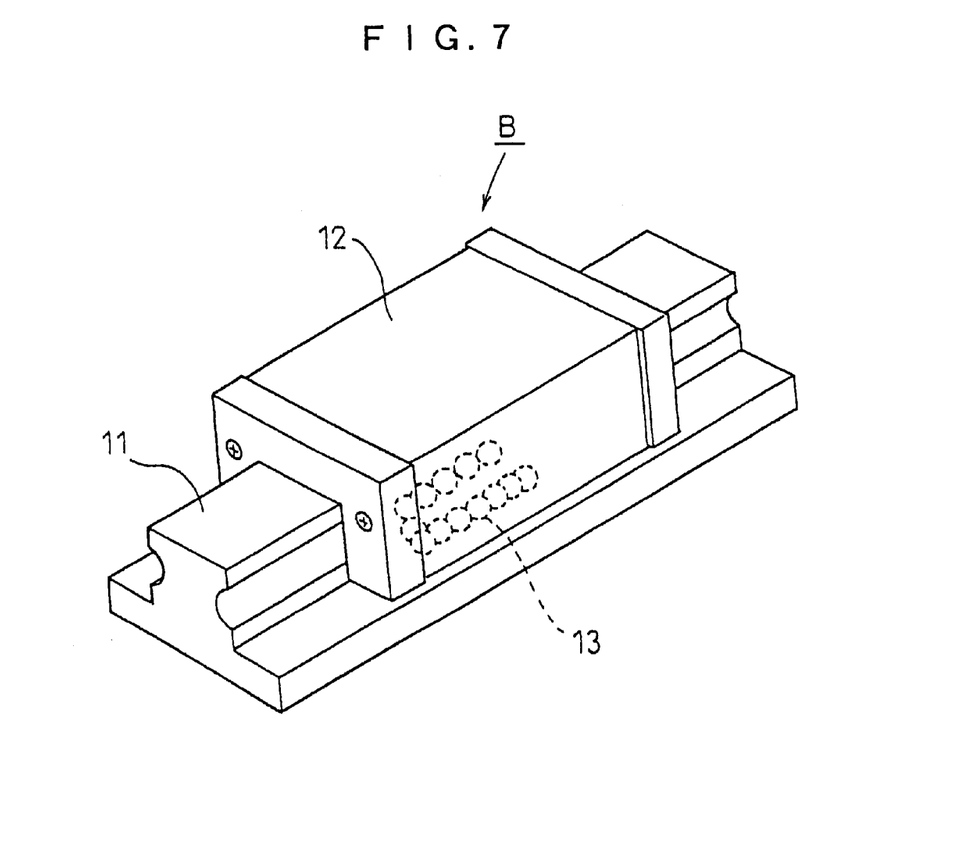
FIG. 7 is a perspective view of the direct-acting type bearing of FIG. 6.
Figure 8:
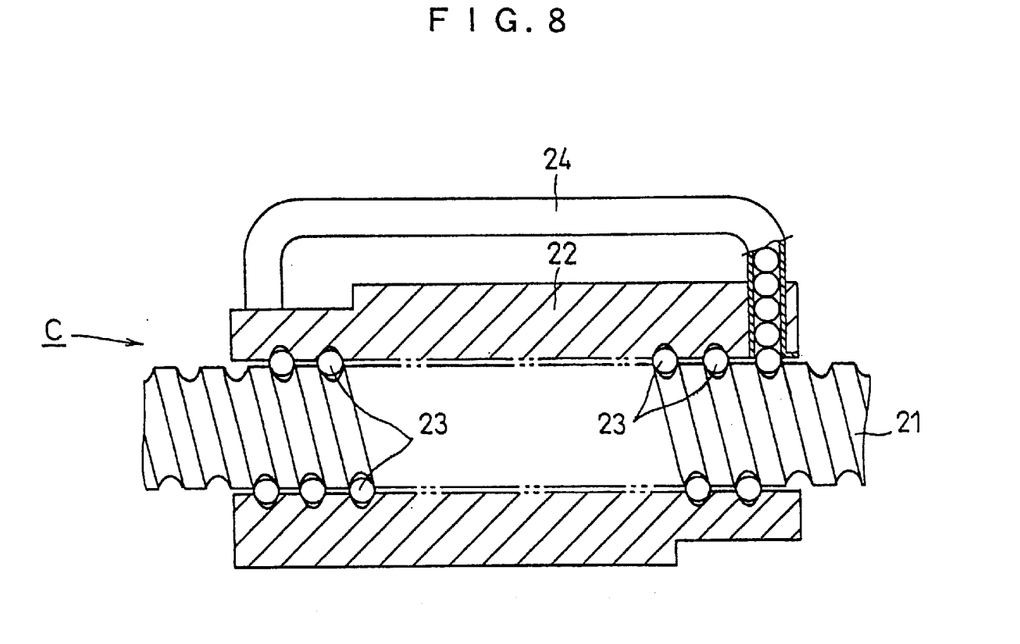
FIG. 8 is a longitudinal sectional view of an upper half of a ball screw device according to still another embodiment of the present invention.

The present invention is similarly applicable to a direct-acting type bearing as illustrated in FIGS. 6 and 7 or to a ball screw device as illustrated in FIG. 8 in addition to its application to the rolling bearing A.

More particularly, the direct-acting type bearing B as illustrated in FIGS. 6 and 7 comprises a rail 11 with linear orbital grooves being formed on outer surfaces thereof, a tubular slider 12 that is fitted to the rail 11 and is formed with orbital grooves that are in parallel with the orbital grooves of the rail 11, and a plurality of rolling members 13 that are interposed between the orbital grooves of the rail 11 and the orbital grooves of the tubular slider 12 in a freely rolling condition, wherein the tubular slider 12 is linearly slid along the rail 11. It should be noted that the rolling members 13 are arranged that they are circulated by rolling through transfer paths 14 that are formed in the interior of the tubular slider 12 upon rolling between the orbital grooves of the rail 11 and the orbital grooves of the tubular slider 12.

The orbital grooves of the rail 11 and the orbital grooves of the tubular slider 12 of such a direct-acting type bearing B correspond to the orbital grooves of the inner and outer rings 1, 2 of the rolling bearing A of the afore-described embodiment, and the rolling members 13 of the direct-acting type bearing B correspond to the rolling member 3 of the rolling bearing A of the afore-described embodiment. Thus, the relationship between the surface roughness of the rail 11, the tubular slider 12 and the rolling members 13 and the form for adhering the lubricating oil 5 shall be similarly set to meet the descriptions of the above-described embodiment.

The ball screw device C as illustrated in FIG. 8 is comprised of a screw shaft 21 with a spiral orbital groove being formed on an outer peripheral surface thereof, a nut member 22 with a spiral orbital groove being formed on an inner peripheral surface thereof, and a plurality of rolling members 23 that are interposed between both orbital grooves in a freely rolling manner, wherein through turning actions of either one of the screw shaft 21 and the nut member 22, the either one member is linearly moved in an axial direction of the screw shaft 21. It should be noted that the rolling members 23 are lubricated by rolling through a circulator tube 24 that is provided at the nut member 22 upon rotating between the orbital groove of the screw shaft 21 and the orbital groove of the nut member 22.

The orbital groove of the screw shaft 21 and the orbital groove of the nut member 22 of such a ball screw bearing C correspond to the orbital grooves of the inner and outer rings 1, 2 of the rolling bearing A of the afore-described embodiment, and the rolling members 23 of the ball screw bearing C correspond to the rolling member 3 of the rolling bearing A of the afore-described embodiment. Thus, the relationship between the surface roughness of the screw shaft 21, the nut member 22 and the rolling members 23 and the form for adhering the lubricating oil 5 shall be similarly set to meet the descriptions of the above-described embodiment.

Though neither the direct-acting type bearing B nor the ball screw device C are illustrated with the lubricating oil 5 being adhered, these bearings will be similar to the condition as illustrated in FIG. 2.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A rolling device comprising:
a first member and a second member which are oppositely disposed so that said first member and said second member are relatively displaceable, and
a plurality of rolling members that are rollingly disposed between opposing faces of both said first and second members and that are of a surface roughness that is less than a surface roughness of the first member and the second member,
wherein a fluorine lubricating oil has a molecular structure with a functional group and said fluorine lubricating oil is adhered to at least the opposing faces of both said first and second members in a manner as to fill the surface roughness to extend from crest portions to trough portions.

2. The rolling device as claimed in claim 1, wherein the fluorine lubricating oil is fluoropolyether polymer intermixed with a suitable binder as a base oil thereof into which a functional group is mixed to its molecular structure.

3. The rolling device as claimed in claim 2, wherein the fluoropolyether polymer is a polymer having a main structural unit that is given by a general formula of —$C_xF_{2x}$—O— (wherein x is an integer of 1 to 4) with an average molecular weight amount of 1,000 to 50,000.

4. The rolling device as claimed in claim 1, wherein the fluorine lubricating oil is polyfluoroalkyl polymer intermixed with a suitable binder as a base oil thereof into which a functional group is mixed to its molecular structure.

5. The rolling device as claimed in claim 4, wherein the polyfluoroalkyl polymer is represented by the chemical formula 1 below.

[Chemical Formula 1]

6. The rolling device as claimed in claim 1, wherein the surface roughness of both said first and said second members is set to be 0.1 to 0.2 µm in units of ten-score average roughness and the surface roughness of the rolling members is set to be 0.01 to 0.02 µm in units of ten-score average roughness, respectively.

7. The rolling device according to claim 1, wherein:
said first member is an inner ring of a rolling bearing,
said second member is an outer ring of the rolling bearing disposed in a concentric manner with respect to the inner ring, and
said opposing faces of said first and second members are groove surfaces of the inner ring and outer ring.

8. The rolling device according to claim 1, wherein:
said first member is a rail of a direct-acting bearing including orbital grooves, and
said second member is a tubular slider of the direct acting bearing that is fitted to the rail and includes orbital grooves that are in parallel with the orbital grooves of the rail, and
said opposing faces of said first and second members are the orbital grooves of the rail and tubular slider.

9. The rolling device according to claim 1, wherein:
said first member is a screw shaft of a ball screw with a spiral orbital groove being formed on an outer peripheral surface thereof, and
said second member is a nut member of the ball screw with a spiral orbital groove being formed on an inner peripheral surface thereof, and
said opposing faces of said first and second members are said spiral orbital grooves of said screw shaft and said nut member.

* * * * *